(12) United States Patent
Nakamura et al.

(10) Patent No.: US 10,798,926 B2
(45) Date of Patent: Oct. 13, 2020

(54) HANDLE RETURN POSITION ADJUSTMENT MECHANISM FOR A FISHING REEL

(71) Applicant: Shimano Inc., Sakai, Osaka (JP)

(72) Inventors: Kohei Nakamura, Sakai (JP); Kunio Takechi, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 0 days.

(21) Appl. No.: 16/385,390

(22) Filed: Apr. 16, 2019

(65) Prior Publication Data
US 2019/0357511 A1 Nov. 28, 2019

(30) Foreign Application Priority Data
May 22, 2018 (JP) .................................. 2018-097783

(51) Int. Cl.
*A01K 89/01* (2006.01)
*A01K 89/00* (2006.01)

(52) U.S. Cl.
CPC .................................. *A01K 89/006* (2013.01)

(58) Field of Classification Search
CPC .......................... A01K 89/004; A01K 89/006; A01K 89/0118; A01K 89/0176; A01K 89/0186
See application file for complete search history.

(56) References Cited

U.S. PATENT DOCUMENTS 2,282,995 A * 5/1942 Dumond .......... A01K 89/01908
242/269
3,224,703 A * 12/1965 Clark ................. A01K 89/0102
242/242
3,375,993 A * 4/1968 Hayes .................. A01K 89/009
242/284
3,990,323 A * 11/1976 Kamikawa ........... A01K 89/009
242/284
4,815,676 A * 3/1989 Young .................. A01K 89/057
242/267
5,071,086 A * 12/1991 Roberts ............ A01K 89/01907
242/268
5,372,324 A * 12/1994 Sato ................... A01K 89/0155
242/312

(Continued)

FOREIGN PATENT DOCUMENTS

JP 3490892 B2 1/2004

*Primary Examiner* — Emmanuel M Marcelo
(74) *Attorney, Agent, or Firm* — United IP Counselors, LLC

(57) ABSTRACT

A handle return position adjustment mechanism for a fishing reel including a handle disposed on the fishing reel and supported by a handle shaft is disclosed. The handle return position adjustment mechanism includes a position adjustment member detachably and non-rotatably fitted to the handle shaft and having a first rotation engagement portion, and a second rotation engagement portion disposed on the handle to be engageable with the first rotation engagement portion. At least one of the first rotation engagement portion and the second rotation engagement portion includes a plurality of portions which are arranged at intervals in a circumferential direction circling around the handle shaft. The second rotation engagement portion is selectively engaged in a relative position in the circumferential direction with respect to the first rotation engagement portion.

7 Claims, 14 Drawing Sheets

(56) References Cited

U.S. PATENT DOCUMENTS

| | | | | |
|---|---|---|---|---|
| 5,582,356 | A * | 12/1996 | Kobayashi | A01K 89/006 242/230 |
| 5,690,290 | A * | 11/1997 | Asano | F16B 37/14 242/283 |
| 5,906,323 | A * | 5/1999 | Morimoto | A01K 89/006 242/283 |
| 6,029,922 | A * | 2/2000 | Kim | A01K 89/006 242/283 |
| 6,032,893 | A * | 3/2000 | Sekimoto | A01K 89/006 242/283 |
| 6,286,774 | B1 * | 9/2001 | Oh | A01K 89/006 242/283 |
| 6,305,627 | B1 * | 10/2001 | Stiner | G05G 1/085 242/283 |
| 6,464,158 | B1 * | 10/2002 | Sakurai | G05G 1/085 242/283 |
| 6,666,396 | B2 * | 12/2003 | Landwerlen | A01K 89/006 242/283 |
| 8,523,096 | B2 * | 9/2013 | Kawasaki | A01K 89/006 242/257 |
| 9,295,241 | B2 * | 3/2016 | Ikuta | A01K 89/006 |
| 10,004,215 | B2 * | 6/2018 | Hyun | A01K 89/006 |
| 10,091,979 | B2 * | 10/2018 | Chew | A01K 89/0193 |

* cited by examiner

HANDLE RETURN POSITION ADJUSTMENT MECHANISM FOR A FISHING REEL

CROSS-REFERENCE TO RELATED APPLICATIONS

This application claims priority to Japanese Patent Application No. 2018-097783, filed May 22, 2018. The contents of that application are incorporated by reference herein in their entirety.

BACKGROUND

Technical Field

The present disclosure relates to a handle return position adjustment mechanism for a fishing reel.

Background Information

Conventionally, a dual-bearing reel known as one of the fishing reels for releasing a fishing line in a forward direction has a clutch mechanism for connecting and disconnecting a handle and a spool. By operating this clutch mechanism, a fishing line can be released from the spool or wound about the spool.

The clutch mechanism is composed of a pinion gear and a radially extending clutch pin located on the spool shaft. A meshing groove capable of engaging with the clutch pin is formed on an end surface of the pinion gear, and by moving the pinion gear in the axial direction, the clutch mechanism is engaged/disengaged (turned ON/OFF). The clutch mechanism can be operated to enter the disengaged state by a clutch operating mechanism. The clutch operating mechanism includes, for example, a clutch operating lever swingably attached to a reel body between an engaged posture and a disengaged posture, a clutch plate that moves toward the spool shaft by the swinging of the clutch operating lever, a clutch yoke that moves in the direction of the spool shaft by the movement of the clutch plate, and a pair of guide shafts for guiding the clutch yoke in the direction of the spool shaft (refer to, for example, Japanese Patent No. 3490892).

The clutch plate moves between an engaged position far from the spool shaft and a disengaged position close to the spool shaft in response to the swinging of the clutch operating lever. The clutch plate includes a first plate portion and a second plate portion disposed with the spool shaft interposed therebetween, and an arm portion extending from the second plate portion towards the side of a handle shaft. A first cam portion and a second cam portion for moving the clutch yoke along the spool shaft direction are separately disposed on the first plate portion and the second plate portion. The arm portion further extends from the second plate portion to the side of the handle shaft, and a pivot support portion is disposed at the distal end of the arm portion. A pivot shaft for rotatably supporting a clutch return mechanism is mounted on the pivot support portion.

The clutch return mechanism includes a clutch pawl that is rotatably supported on the pivot shaft disposed on the pivot support portion and a rotating member having a pressing portion to press a fishing reel latch pawl. Normally, a ratchet wheel of a pawl type one-way clutch is used as the rotating member, and the pressing portion (return pin) is disposed on the ratchet wheel. The clutch pawl moves to an contact position close to the handle shaft and a disengaged position far from the handle shaft in conjunction with the movement of the clutch plate between the clutch ON position and the clutch OFF position. In addition, a toggle spring biases the clutch pawl between the contact posture and the release posture.

In the clutch return mechanism having such a configuration, in response to operation of the clutch operating lever from the engaged posture to the disengaged posture, the clutch plate moves from the engaged position to the disengaged position. As a result, the clutch yoke moves the pinion gear away from the clutch pin, whereby the clutch mechanism enters the clutch OFF state. At the same time, the clutch pawl moves from the released posture to the contact posture. In the contact posture, the tip end portion of the clutch pawl can be pressed by the return pin of the ratchet wheel. When the handle rotates in the line winding direction in the clutch OFF state, the tip end portion of the clutch pawl is pressed by the return pin and the clutch pawl moves from the contact posture to the release posture, whereby the clutch plate is moved from the disengaged position to the engaged position by the clutch pawl. As a result, the clutch mechanism returns to the clutch ON state. At this time, the force of the clutch pawl is transmitted to the clutch plate via the pivot shaft.

BRIEF SUMMARY

However, in the conventional fishing reel, the pressing position of the tip end portion of the clutch pawl by the return pin, that is, the position to be moved from the contact posture to the release posture by the pressing force of the return pin is determined at a predetermined rotation angle. In other words, since the ratchet wheel having the return pin is supported coaxially and non-rotatably to the handle shaft, the handle is also mounted on the handle shaft only at a position determined in the circumferential direction with respect to the return pin.

Also, when changing the handle return position at the time of releasing the clutch, it was necessary to perform laborious work such as adjusting the rotation angle of the handle return position by disassembling the reel and rearranging the ratchet hole with the return pin. For this reason, there is a need for a device in which the handle return position can be easily adjusted to the user's preferred rotation angle by performing a simple adjustment without disassembling the reel, and the reel still has room for improvement in that respect.

The present disclosure has been made in consideration of such circumstances, and it is an object of the present disclosure to provide a handle return position adjustment mechanism for a fishing reel capable of easily adjusting the position of a handle return to a user's preferred rotation angle without disassembling a reel and provide a fishing reel uving such a return position adjustment mechanism.

(1) A handle return position adjustment mechanism for a fishing reel according to the present disclosure includes a handle disposed on the fishing reel and supported by a handle shaft, and the mechanism is configured to adjust a return position of the handle in a rotational direction at the time of returning a clutch from a disengaged state to an engaged state, in which the clutch is configured to switch between an engaged state in which a spool disposed in a reel body of the fishing body and the handle are connected to each other and a disengaged state in which the spool and the handle are disconnected from each other. The handle return position adjustment mechanism includes a position adjustment member detachably and non-rotatably fitted to the handle shaft and having a first rotation engagement portion, and a second rotation engagement portion that is disposed on the handle to be engageable with the first rotation engagement portion. At least one of the first rotation engagement portion and the second rotation engagement portion includes a plurality of portions which are arranged at intervals in a circumferential direction circling around the handle shaft, and the second rotation engagement portion is selectively engaged in a relative position in the circumferential direction with respect to the first rotation engagement portion.

According to the handle return position adjustment mechanism of the fishing reel of the present disclosure, at least one of the first rotation engagement portion and the second rotation engagement portion are plural and disposed at intervals in the circumferential direction, and therefore it is possible to select a relative position in the rotational direction with respect to the first rotation engagement portion of the position adjustment member fitted to the handle shaft non-rotatably to thereby engage the second rotation engagement portion of the handle. This configuration allows the handle to be attached to the handle shaft via the position adjustment member, and to arbitrarily select the rotation angle corresponding to the circumferential interval of the first rotation engagement portion to thereby attach the handle to the handle shaft.

As described above, according to the present disclosure, a handle return position in the rotational direction of a handle of a fishing reel can be easily adjusted without disassembling the fishing reel as in the conventional one, thereby making it possible for a user using the fishing reel to perform a handle return at a desired rotation angle and switch the clutch from the disengaged state to the engaged state.

(2) The position adjustment member is a polygonal member having apex portions as the first rotation engagement portion. The second rotation engagement portion can be recessed grooves disposed at positions corresponding to the apex portions of the polygonal member, is engageable with the apex portions, and extends in the axial direction of the handle shaft.

In this case, an arbitrary apex portion out of the plurality of apex portions (first rotation engagement portions) of the polygonal member fitted to the handle shaft is selected to engage the recessed groove of the second rotation engagement portion of the handle, whereby the handle can be easily changed to the handle return position at the preferred rotation angle.

(3) The position adjustment member has first concave/convex portions as the first rotation engagement portion, each of the first concave/convex portions including one of a convex portion and a concave portion disposed on a surface directed toward the handle in the axial direction of the handle shaft. The second rotation engagement portion is a second concave/convex portion including another one of a convex portion and a concave portion disposed on a surface of the handle directed toward the position adjustment member so as to be engageable with the first concave/convex portions.

In this case, an arbitrary first concave/convex portion out of the plurality of first concave/convex portions (first rotation engagement portions) of the position adjustment member fitted to the handle shaft is selected to engage the second concave/convex portion of the second rotation engagement portion of the handle, whereby the handle can be easily changed to the handle return position at the preferred rotation angle.

(4) The handle includes a handle arm supported by the handle shaft and a handle grip disposed on at least one end of the handle arm, wherein a plurality of mounting portions are disposed in the handle arm in the longitudinal direction of the handle arm so as to be detachably attached to the handle shaft, and at least one of the plurality of mounting portions is a second rotation engagement group that is a group of the plurality of portions of the second rotation engagement portion to be engaged with the first rotation engagement portion of the position adjustment member.

In this case, by selecting a plurality of mounting portions of the handle arm and engaging with the position adjustment member, in addition to adjusting the return position of the handle, a support position in the longitudinal direction of the handle arm supported by the handle shaft can be adjusted. That is, it is possible to adjust the distance between the handle shaft and the handle grip in the handle arm according to the user's preference.

According to the handle return position adjustment mechanism of the fishing reel of the present disclosure, it is possible to easily adjust the position of the handle return at the user's preferred rotation angle without disassembling the reel.

BRIEF DESCRIPTION OF THE DRAWINGS

[Referring now to the attached drawings which form a part of this original disclosure.

DETAILED DESCRIPTION

Hereinafter, an embodiment of a handle return position adjustment mechanism of a fishing reel according to the present disclosure will be described with reference to the drawings. Note that in the present embodiment, a dual-bearing reel will be described as an example of the fishing reel. Further, in each drawing, there are cases where the scale of each constituent member is appropriately changed as necessary in order to make the constituent members visually recognizable.

First Embodiment

Figure 1:
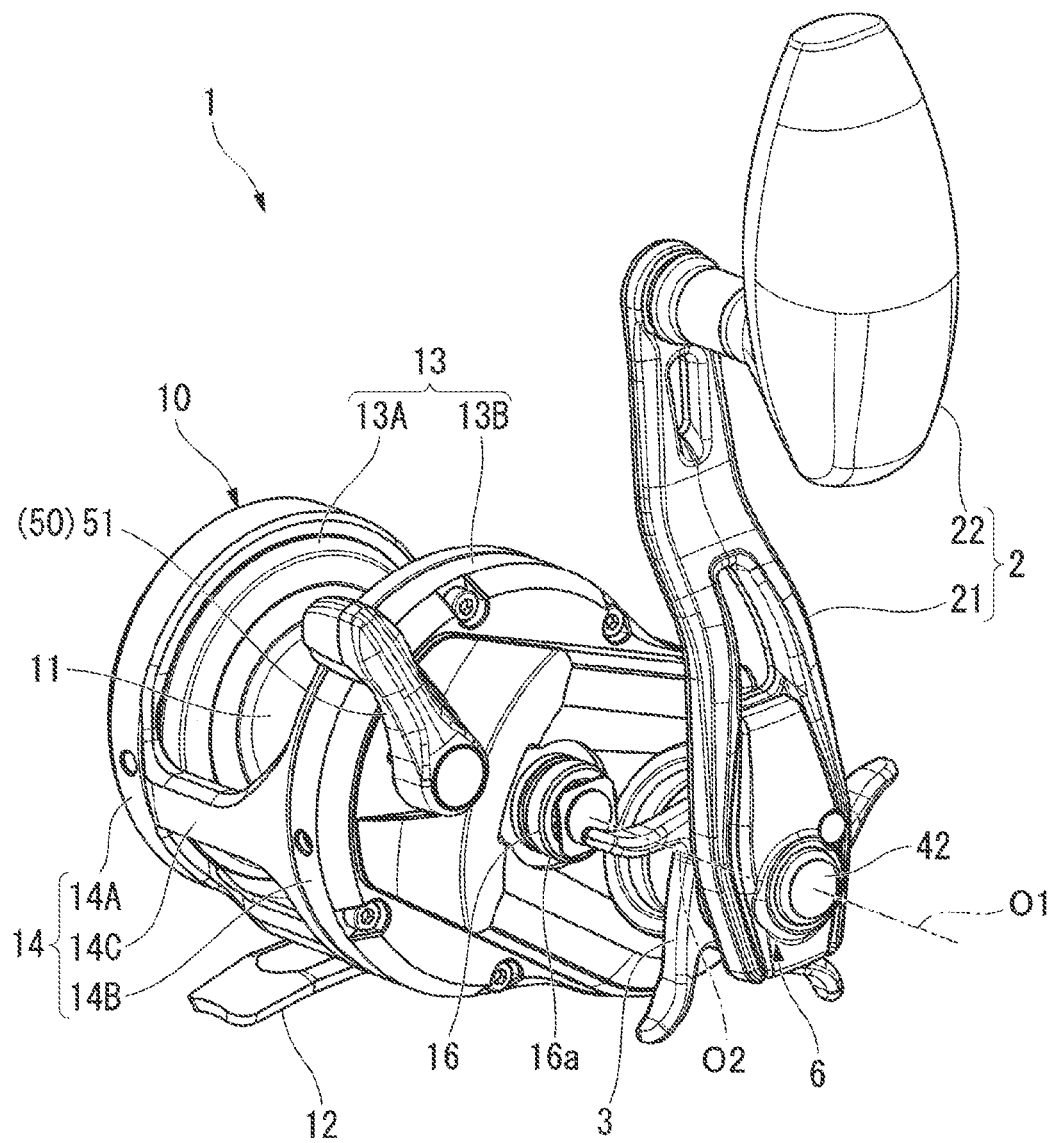
FIG. 1 is a perspective view of a structure of a dual-bearing reel according to a first embodiment of the present disclosure.

As shown in FIG. 1, a handle return position adjustment mechanism of the present embodiment is disposed in a dual-bearing reel 1 (fishing reel) made of, for example, a medium-sized round reel, and is a mechanism for adjusting the return position of a handle 2 in the rotational direction at the time of returning a clutch mechanism 5 (refer to FIG. 2) from a disengaged state to an engaged state. The clutch mechanism 5 is configured to switch between the engaged state for connecting a spool 11 disposed in a reel body 10 with the handle 2 and the disengaged state for disconnecting the spool 11 from the handle 2.

(Overall Structure)

The dual-bearing reel 1 includes the reel body 10, the handle 2 for rotating the spool disposed on a side of the reel body 10, and a star drag 3 disposed on a reel body 10 side of the handle 2. The spool 11 is mounted on the reel body 10 so as to be rotatable around a spool axis O2 parallel to a handle axis O1 with respect to the reel body 10 and a fishing line (not shown) is wound around the spool 11. The reel body 10 is adapted to be mounted on a fishing rod (not shown) via a rod attaching leg 12.

The spool 11 is driven by a spool drive mechanism (not shown), and the clutch mechanism 5 (refer to FIG. 2) driven by a clutch operating mechanism 50 (clutch operating lever 51) is interlocked therewith.

Here, in the present embodiment, the direction orthogonal to the direction along the handle axis O1 and the spool axis O2, and along the direction in which the fishing line wound around the spool 11 is released is defined as "front-rear direction". The direction in which the fishing line is released from the spool 11 in the front-rear direction is defined as the "front" and the opposite direction is defined as the "rear".

(Reel Body)

Figure 2:
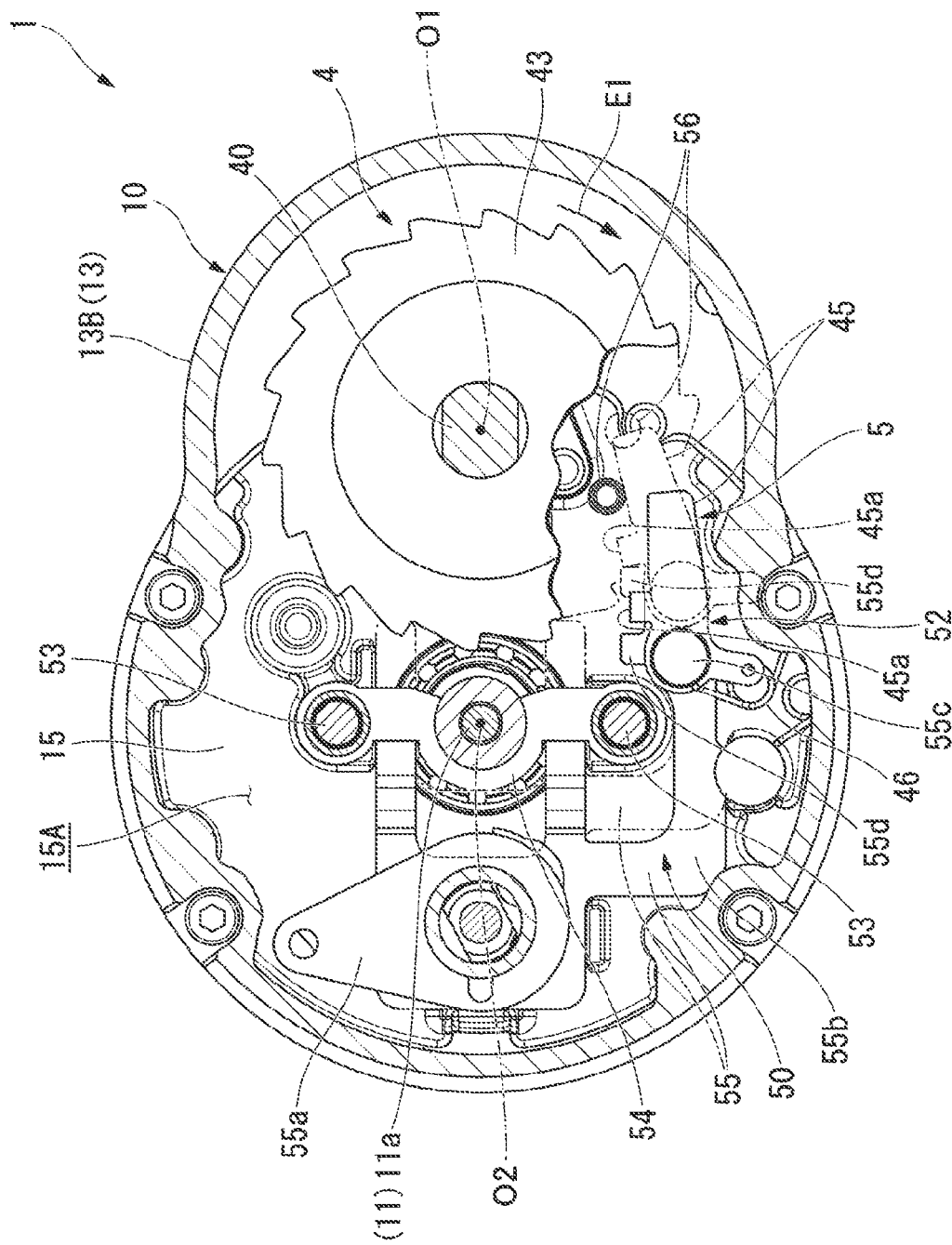
FIG. 2 is a side view of the internal configuration of a reel body as seen from a direction of a handle shaft.

The reel body 10 includes a frame 13, a cover 14, and a mechanism mounting plate 15 (refer to FIG. 2). The frame 13 is formed by die cast molding and has a pair of side plates 13A and 13B disposed at a predetermined interval from each other. One side plate, i.e., the first side plate 13A has a circular shape when viewed from the side surface in the direction of the handle axis O1. The other side plate, i.e., the second sideplate 13B, similarly, has a circular shape in which a portion of the shape protrudes in the radial direction when viewed from the side.

Formed by press forming a metal thin plate, the cover 14 includes a first side cover 14A covering the outer side of the first sideplate 13A, a second side cover 14B integrally fixed so as to cover an outer peripheral portion of the circular portion coaxial with the spool axis O2 of the second sideplate 13B, and a plurality of coupling members 14C coupling the side covers 14A and 14B to each other. The coupling member 14C is made of a plate-like member and is located at intervals in the circumferential direction of the first side cover 14A and the second side cover 14B.

As shown in FIG. 2, the mechanism mounting plate 15 is disposed on the second side plate 13B, and formed with a space 15A for accommodating various mechanisms to be described later. Here, FIG. 2 is a cross sectional view of the space 15A as seen from the side of the handle 2 in the direction of the handle axis O1, and illustrates a state in which a part of a ratchet wheel 43 to be described later is cut out.

(Handle)

Figure 3:
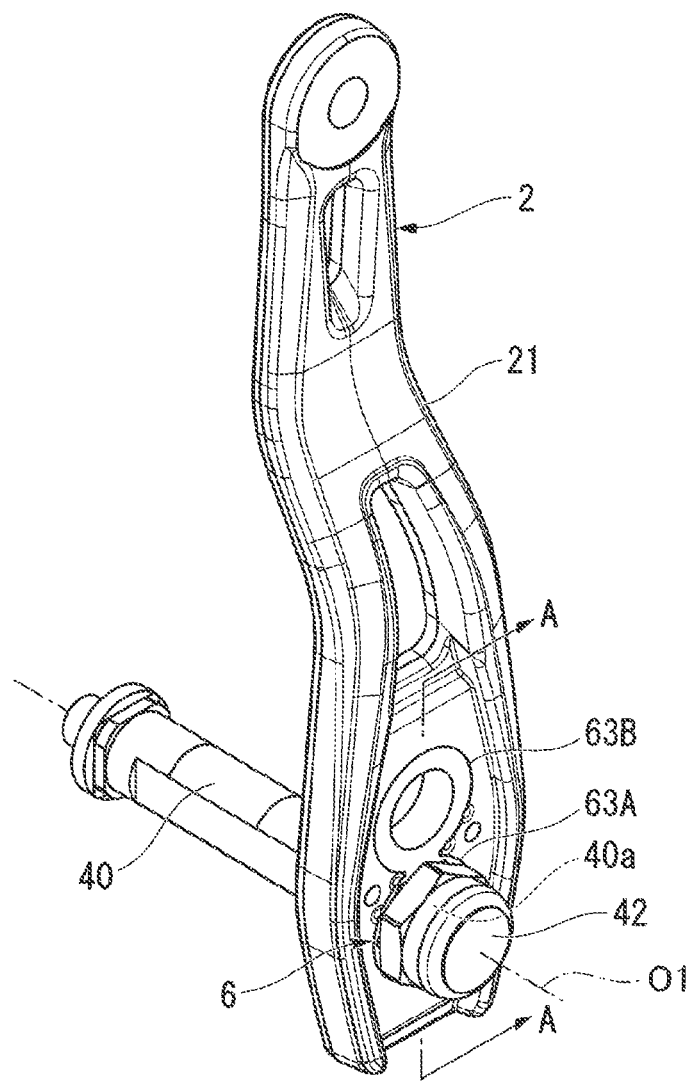
FIG. 3 is a perspective view of a handle arm attached to a handle shaft.

As shown in FIGS. 1 and 3, the handle 2 includes a handle arm 21 non-rotatably mounted on a shaft distal end portion 40a of a handle shaft 40, and a handle grip 22 (refer to FIG. 1) mounted at one end of the handle arm 21 so as to be freely rotatable around an axis parallel to the handle axis O1. The handle 2 is detachably attached to the handle shaft 40 via a handle return position adjustment mechanism 6 of the present embodiment.

(Spool)

As shown in FIGS. 1 and 2, the spool 11 is rotatably disposed between the first side plate 13A and the second side plate 13B. A spool shaft 11a (refer to FIG. 2) penetrates the center of the spool 11 and is fixed thereto. The spool shaft 11a is rotatably supported on the first side cover 14A and the mechanism mounting plate 15 via bearings, respectively. A casting control mechanism 16 is disposed at both ends of the spool shaft 11a.

As shown in FIG. 1, the casting control mechanism 16 is configured to be easily changed, in multiple stages, from a state in which fine adjustment can be performed to a state where adjustment cannot be performed by turning a knob member 16a disposed on the second side plate 13B.

(Clutch Mechanism)

As shown in FIG. 2, a rotation transmission mechanism 4 for transmitting a torque from the handle 2 to the spool 11, the clutch mechanism 5 located in the rotation transmission mechanism 4, and the clutch operating mechanism 50 for turning the clutch mechanism 5 ON and OFF are disposed in the space 15A between the mechanism mounting plate 15 and the second side plate 13B.

(Rotation Transmission Mechanism)

The rotation transmission mechanism 4 includes the handle shaft 40 having the handle 2 (refer to FIG. 1) fixed to one end thereof and a pinion gear (not shown) meshing with a main gear (not shown) coupled to the other end of the handle shaft 40. The main gear has gear teeth on its outer circumference and is rotatably mounted on the handle shaft 40. The pinion gear constitutes the rotation transmission mechanism 4 and also functions as the clutch mechanism 5.

Disposed on a pinion shaft (not shown) that is rotatably supported on the second side plate 13B via a bearing, the pinion gear integrally extends with the spool shaft 11a and is movable in the axial direction along the pinion shaft. In addition, a circumferential groove is formed on the outer periphery of the pinion gear, and an operating member of the clutch mechanism 5 is engaged with this circumferential groove to move the pinion gear in the axial direction, so that the driving force is released. Note that the disengagement of the clutch mechanism 5 is actuated by rotating the clutch operating lever 51 (refer to FIG. 1) of the clutch operating mechanism 50 disposed on the second side plate 13B.

The handle shaft 40 is disposed parallel to the spool shaft 11a, and one end side of the handle shaft 40 is rotatably supported by the mechanism mounting plate 15. The main gear is connectable to one end side of the handle shaft 40 so as to integrally rotate therewith. With such a configuration, in a state where the clutch mechanism 5 is brought to the clutch ON state, the torque from the handle 2 is directly transmitted to the spool 11.

(Clutch Mechanism)

The clutch mechanism 5 is switchable between an engaged state (clutch ON state) where the clutch mechanism 5 allows transmission of rotation of the handle 2 to the spool 11 by operation of the clutch operating lever 51 and a disengaged state (clutch OFF state) where the clutch mechanism 5 blocks transmission of rotation of the handle 2 to the spool 11. In the clutch ON state, a rotation of the pinion gear is transmitted to the spool shaft 11a, thereby allowing the pinion gear and the spool shaft 11a to rotate integrally. In the clutch OFF state, the rotation of the pinion gear is not transmitted to the spool shaft 11a, and therefore the spool 11 can freely rotate.

(Clutch Operating Lever)

The clutch operating lever 51 is disposed at a rear part of the reel body 10 and is configured to switch the clutch mechanism 5 between the clutch ON state and the clutch OFF state. The clutch operating lever 51 is disposed closer to the rear of the second side plate 13B and is disposed movably in a direction approaching and separating from the rod attaching leg 12 disposed at the rear part of the reel body 10. In this embodiment, the clutch operating lever 51 is disposed so as to be able to swing around an axis parallel to the spool shaft 11a.

(Spool Drive Mechanism)

The above-described spool drive mechanism drives the spool 11 in the line winding direction. Also, during winding, a drag force is generated on the spool 11 by the star drag 3 to prevent severing of the fishing line. In this configuration, the star drag 3 is disposed coaxially with the handle shaft 40 between the handle arm 21 of the handle 2 and the second side plate 13B.

The rotation transmission mechanism 4 includes the ratchet wheel 43 integrally and rotatably mounted on the handle shaft 40, and a ratchet pawl (not shown) that rotates the handle shaft 40 only in a line winding direction E1 and is capable of meshing with the ratchet wheel 43.

The above-mentioned ratchet pawl is biased toward the side of the ratchet wheel 43. The ratchet wheel 43 also functions as a rotating member of a clutch return mechanism 52 to be described later.

The clutch operating mechanism 50 is a mechanism for operating the clutch mechanism 5 which connects and disconnects between the spool 11 disposed in the reel body 10 of the dual-bearing reel 1 and the handle 2. The clutch operating mechanism 50 includes the clutch operating lever 51, a pair of guide shafts 53 and 53, a clutch yoke 54, a clutch plate 55, and the clutch return mechanism 52.

The clutch operating lever 51 is mounted on the second side plate 13B of the reel body 10 so as to be movable between an engaged posture and a disengaged posture. The pair of guide shafts 53 and 53 are disposed along the spool shaft 11a across the spool shaft 11a on the mechanism mounting plate 15 of the reel body 10. Guided by the pair of guide shafts 53, the clutch yoke 54 is movable along the spool shaft 11a and is engaged with the clutch mechanism 5 to switch the clutch mechanism 5 between the engaged state and the disengaged state.

The clutch return mechanism 52 includes a clutch pawl 45, the ratchet wheel 43, and a toggle spring 46. Here, regarding the clutch pawl 45, the clutch plate 55, and a return pin 56 (to be described) in FIG. 2, the engaged position (clutch ON state) is indicated by a solid line and the disengaged position (clutch OFF state) is indicated by a two-dot chain line When the clutch plate 55 moves from the engaged position (the solid line shown in FIG. 2) to the disengaged position (the two-dot chain line shown in FIG. 2), a contacted portion 45a comes into contact with a contact portion 55d, whereby the clutch pawl 45 is brought into the contact posture. The ratchet wheel 43 includes the return pin 56 capable of pressing the clutch pawl 45 in the contact posture (the two-dot chain line shown in FIG. 2) toward the release posture (the solid line shown in FIG. 2), and the ratchet wheel 43 rotates in conjunction with the handle 2.

When the handle shaft 40 rotates in the line winding direction E1 (clockwise in FIG. 2) at the time of clutch OFF, the return pin 56 abuts on a tip end portion of the clutch pawl 45 in the contact posture to thereby press the clutch plate 55 to the engaging posture side (left side of the page of FIG. 2).

The toggle spring 46 biases the clutch pawl 45 between the contact posture and the release posture. The clutch return mechanism 52 operates in conjunction with the rotation of the handle 2 in the line winding direction E1, in which the return pin 56 of the ratchet wheel 43 presses the clutch pawl 45 to move the clutch plate 55 from the disengaged position to the engaged position.

In the clutch operating mechanism 50, upon operating the clutch operating lever 51 from the engaged posture to the disengaged posture, the clutch plate 55 moves from the engaged position to the disengaged position, and due to the action of an inclined cam portion 55a, the clutch yoke 54 switches the clutch mechanism 5 from the engaged state to the disengaged state. Consequently, the clutch pawl 45 coupled to an arm portion 55b via a pivot shaft 55c moves from the release posture (solid line in FIG. 2) to the contact posture (two-dot chain line in FIG. 2). At this time, the contacted portion 45a of the clutch pawl 45 biased by the toggle spring 46 comes into contact with the contact portion 55d of the arm portion 55b, whereby the contact state is maintained.

When the handle 2 rotates in the line winding direction E1 in this state, the ratchet wheel 43 rotates in the same direction, and the return pin 56 presses the tip end portion of the clutch pawl 45 toward the release posture. At this time, since the contacted portion 45a of the clutch pawl 45 is in contact with the contact portion 55d of the arm portion 55b, the pressing force acting on the clutch pawl 45 is transmitted from the contacted portion 45a to the clutch plate 55 via the contact portion 55d of the arm portion 55b.

Next, a handle return position adjustment mechanism 6 of the dual-bearing reel 1 will be specifically described.

In the present embodiment, as shown in FIG. 1, the handle arm 21 is mounted on the handle shaft 40 via the handle return position adjustment mechanism 6.

Figure 4:
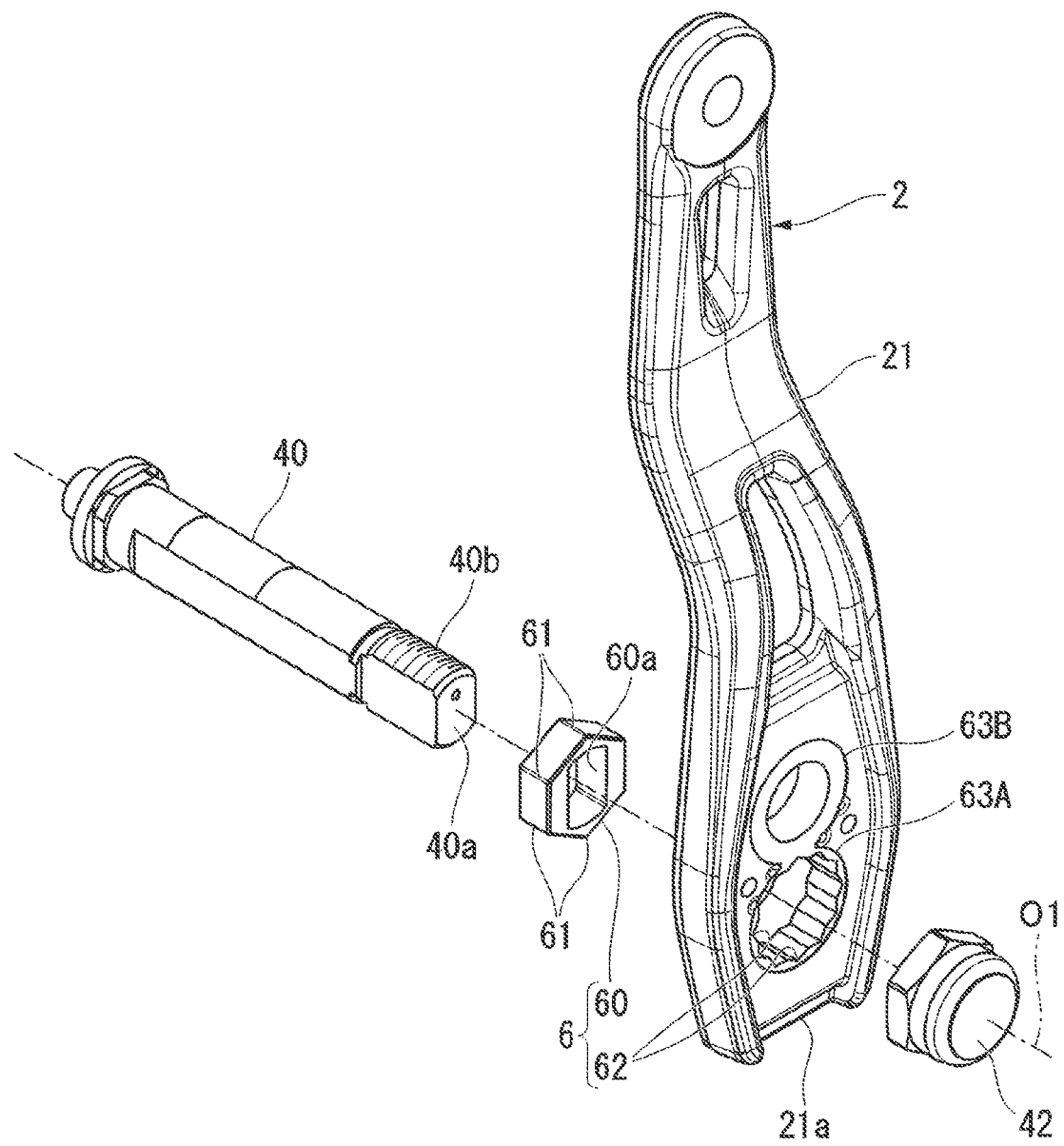
FIG. 4 is an exploded perspective view of the handle shaft and the handle arm shown in FIG. 3.
Figure 5:
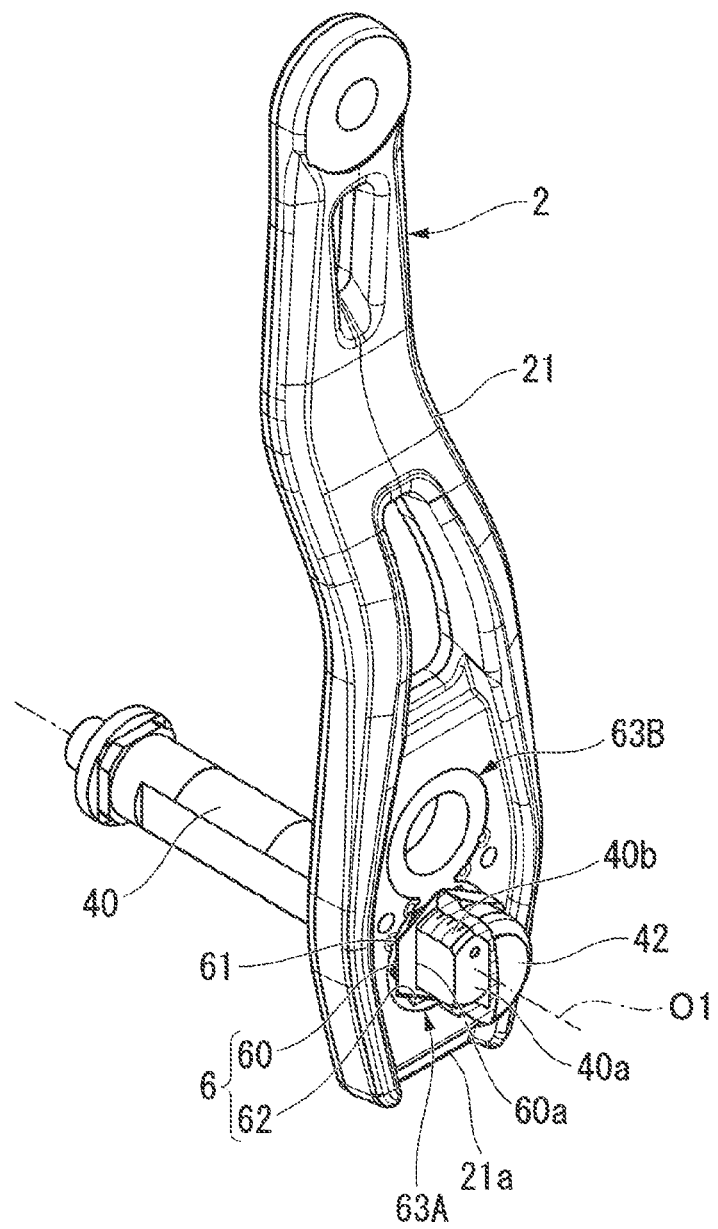
FIG. 5 is a view in which a cap is broken in the perspective view of the handle shaft and the handle arm shown in FIG. 3.

As shown in FIGS. 3 to 5, the handle return position adjustment mechanism 6 includes: a hexagonal member 60 (a position adjustment member, a polygonal member) having a plurality of apex portions 61, 61, ... (six in total) (first concave/convex portion, first rotation engagement portion) detachably disposed on the handle shaft 40; and a plurality of recessed grooves 62, 62, ... (second concave/convex portion, second rotation engagement portion) formed in the handle 2 and engageable with the plurality of apex portions 61 of the hexagonal member 60.

Figure 6:
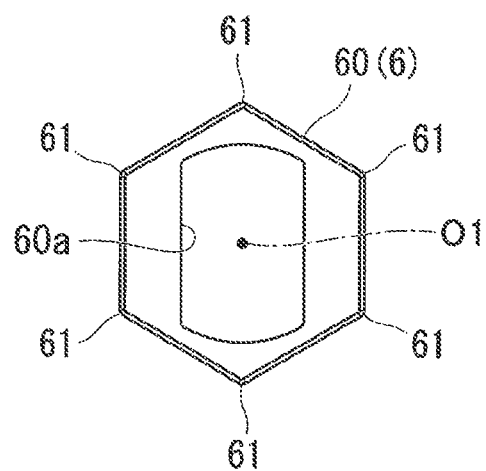
FIG. 6 is a plan view of a hexagonal member as seen from the direction of the handle shaft.

As shown in FIG. 4, the hexagonal member 60 is detachably attached to the shaft distal end portion 40a of the handle shaft 40 and fitted so as to be non-rotatable around the handle shaft 40. The hexagonal member 60 has six apex portions 61 that are located spaced apart from each other in a circumferential direction circling around the handle shaft 40 (refer to FIG. 6).

The shaft distal end portion 40a of the handle shaft 40 is formed in a substantially rectangular shape having a non-circular cross sectional shape when viewed from the direction of the handle axis O1. A male thread portion 40b is formed on apart of the peripheral surface of the shaft distal end portion 40a. A cap 42 formed with a female thread is screwed onto the male thread portion 40b of the shaft distal end portion 40a. By the cap 42 tightened to the shaft distal end portion 40a of the handle shaft 40, the handle arm 21 engaged with the hexagonal member 60 is fixed and prevented from coming off.

As shown in FIGS. 4 to 7, the hexagonal member 60 is a hexagonal member having six apex portions 61, and a through hole 60a is disposed at the center to be fitted to the shaft distal end portion 40a of the handle shaft 40. The shape of the through hole 60a is a non-circular shape having the same substantially rectangular shape as the shaft distal end portion 40a of the handle shaft 40.

Figure 8:
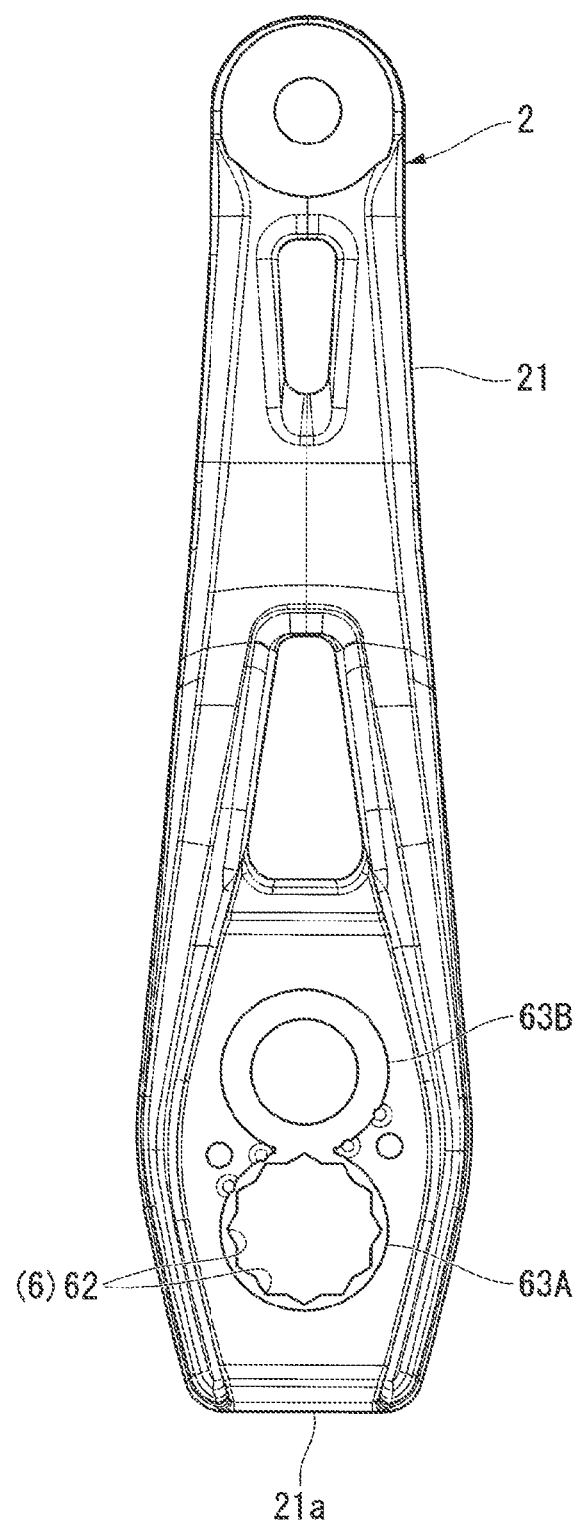
FIG. 8 is a plan view of a configuration of the handle arm.

As shown in FIGS. 4, 5 and 8, on the handle arm 21 of the handle 2, a pair of mounting portions 63A and 63B is disposed side by side in the longitudinal direction of the handle arm 21 so as to be detachably attached to the handle shaft 40. As described above, the plurality of (twelve in this embodiment) recessed grooves 62, 62, . . . to be engaged with the apex portions 61 of the hexagonal member 60 are disposed in the first mounting portion 63A on the side of a base end 21a of the handle arm 21 and are arranged at a constant interval in the circumferential direction. In the illustrated embodiment, the first mounting portion 63A is a hole formed in the handle arm 21, and the plurality of recessed grooves 62, 62, . . . are disposed in the inner periphery of the hole. As shown in FIG. 5, when the plurality of recessed grooves 62, 62, . . . are engaged with the apex portions 61 of the hexagonal member 60, the plurality of recessed grooves 62, 62, . . . are located radially outside the apex portions 61 of the hexagonal member 60.

The first mounting portion 63A forms a second rotation engagement group as a group of the plurality of recessed grooves 62, 62, . . . . In the case of adopting the hexagonal member 60 as in this embodiment, preferably, the number of the recessed grooves 62 are multiples of 6 and the circumferential direction intervals are equally pitched. This configuration allows the handle arm 21 to be mounted at the positions of the 12 rotational angles with respect to the handle shaft 40.

The recessed grooves 62 are located at positions corresponding to the respective apex portions 61 of the hexagonal member 60, and the direction of the grooves extends in the direction of the handle axis O1. Further, the recessed grooves 62, which are engaged with the apex portions 61 of the hexagonal member 60 fitted to the shaft distal end portion 40a, have a function of preventing the handle arm 21 from rotating.

The recessed grooves 62 are configured to selectively engage at the relative positions, that is, the rotation angles, in the circumferential direction with respect to the plurality of apex portions 61. For this reason, the position of the handle arm 21 with respect to the handle shaft 40 is changeable in the circumferential direction.

Figure 9:
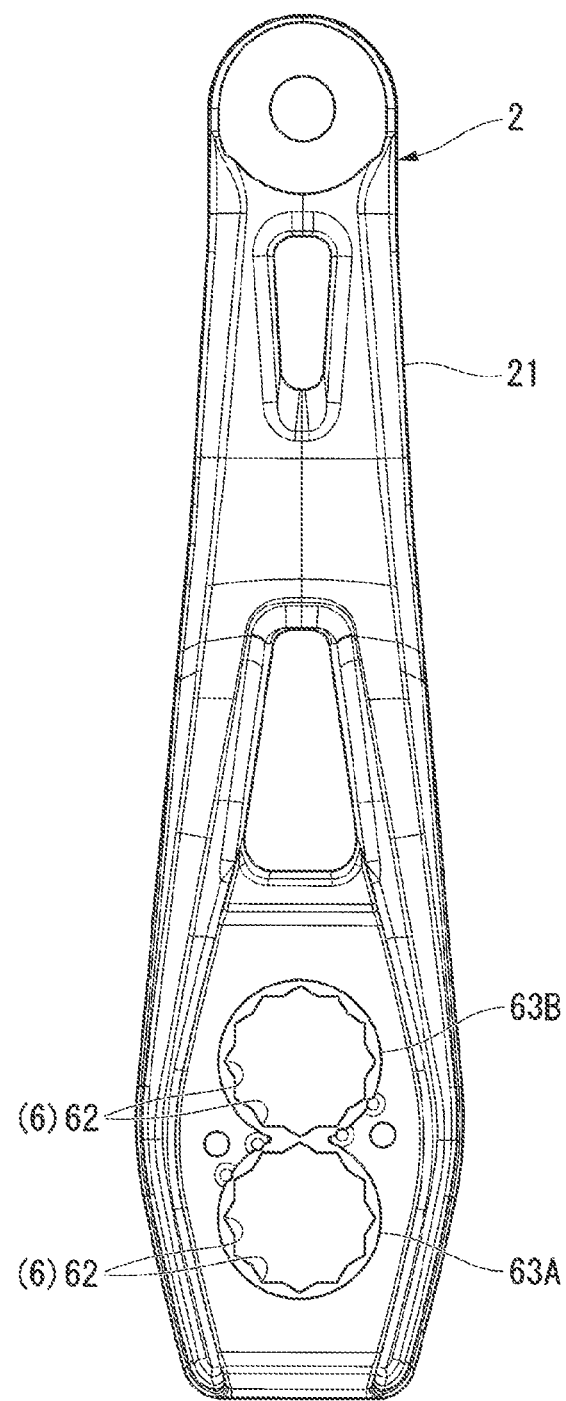
FIG. 9 is a plan view of a configuration of the handle arm in another form.

The second mounting portion 63B can have a fitting hole (not shown) of the same shape as the above-described through hole of the hexagonal member 60 which is fitted to the shaft distal end portion 40a of the handle shaft 40, although a circular hole is formed in the second mounting portion 63B in the illustrated embodiment. Alternatively, as shown in FIG. 9, similarly to the first mounting portion 63A, the second mounting portion 63B can have the plurality of recessed grooves 62, 62, . . . (twelve in this case).

When the handle arm 21 is attached to the handle shaft 40 using the second mounting portion 63B in this manner, the handle grip 22 is fixed at a position where the handle grip 22 has a short turning radius.

Next, a method of adjusting the position of the handle 2 using the handle return position adjustment mechanism 6 configured as described above and an operation of the handle return position adjustment mechanism 6 will be described in detail with reference to the drawings.

Figure 10:
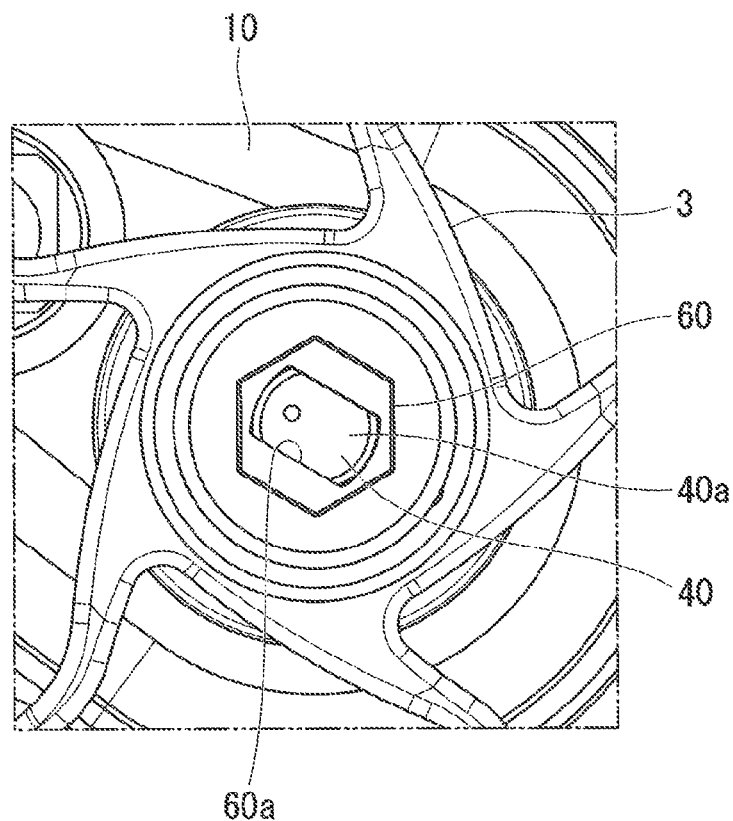
FIG. 10 is a diagram showing a procedure for adjusting a position of the handle return, and is a side view as seen from a direction of the handle shaft.
Figure 11:
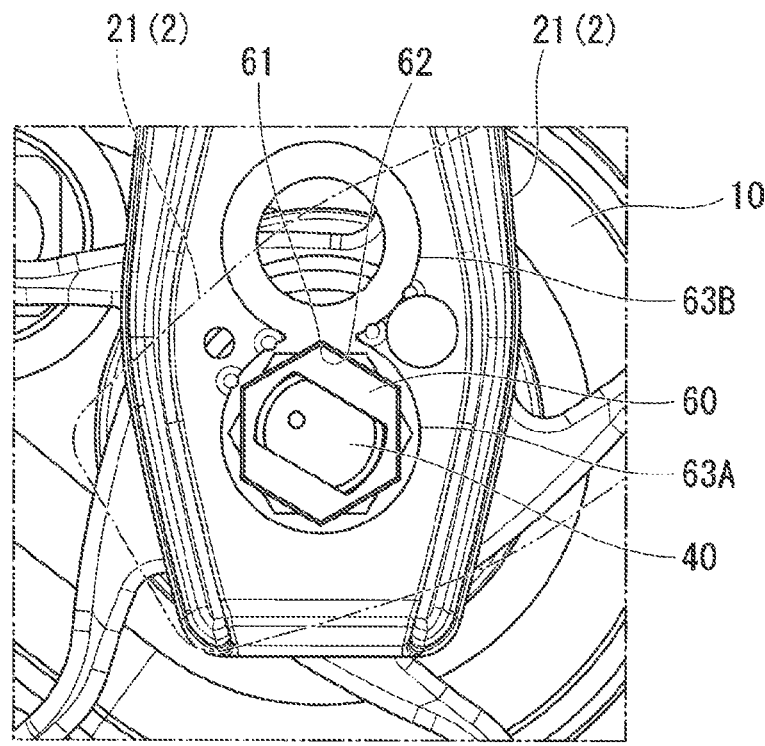
FIG. 11 is a diagram showing a procedure for adjusting the position of the handle return subsequent to FIG. 10.

As shown in FIG. 10, when adjusting the handle return position, the hexagonal member 60 is first fitted to the shaft distal end portion 40a of the handle shaft 40 in the reel body 10 with the handle 2 removed from the handle shaft 40. At this time, the hexagonal member 60 is fixed in a non-rotatable state with respect to the handle shaft 40. Subsequently, as shown in FIG. 11, the first mounting portion 63A of the handle arm 21 is engaged with the hexagonal member 60 at an arbitrary rotation angle. For example, the handle arm 21 can be in a position indicated by a solid line or a position indicated by a two-dot chain line illustrated in FIG. 11.

Figure 7:
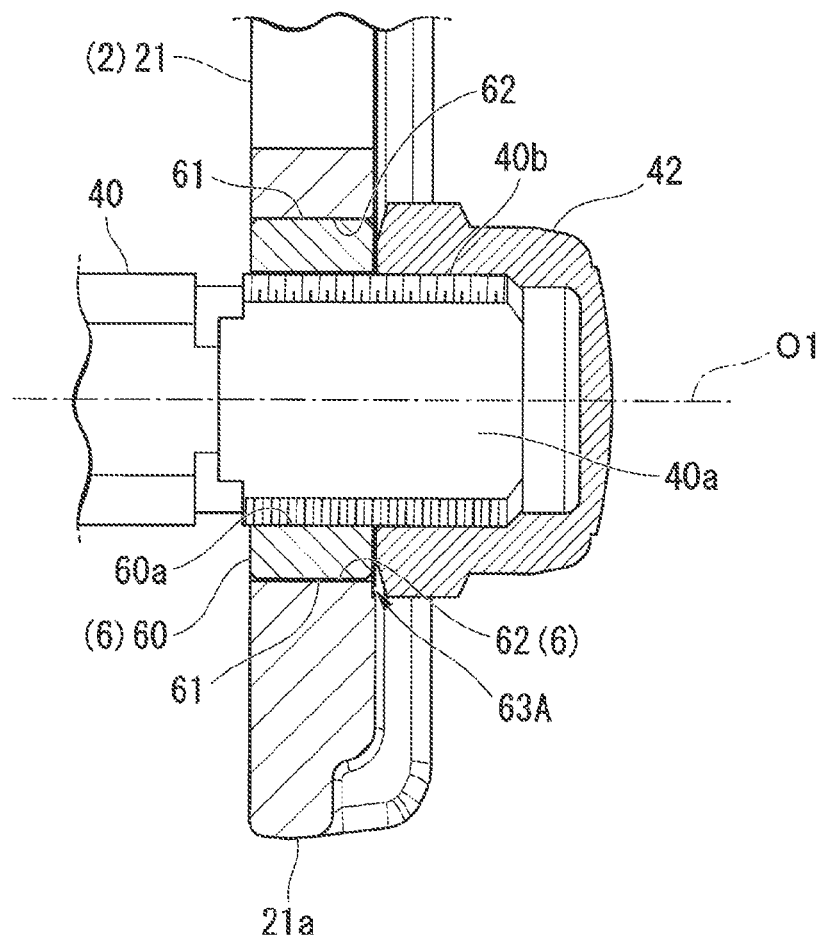
FIG. 7 is a cross-sectional view taken along line A-A in FIG. 3 illustrating a side sectional view of a configuration of a handle return position adjustment mechanism.
Figure 12:
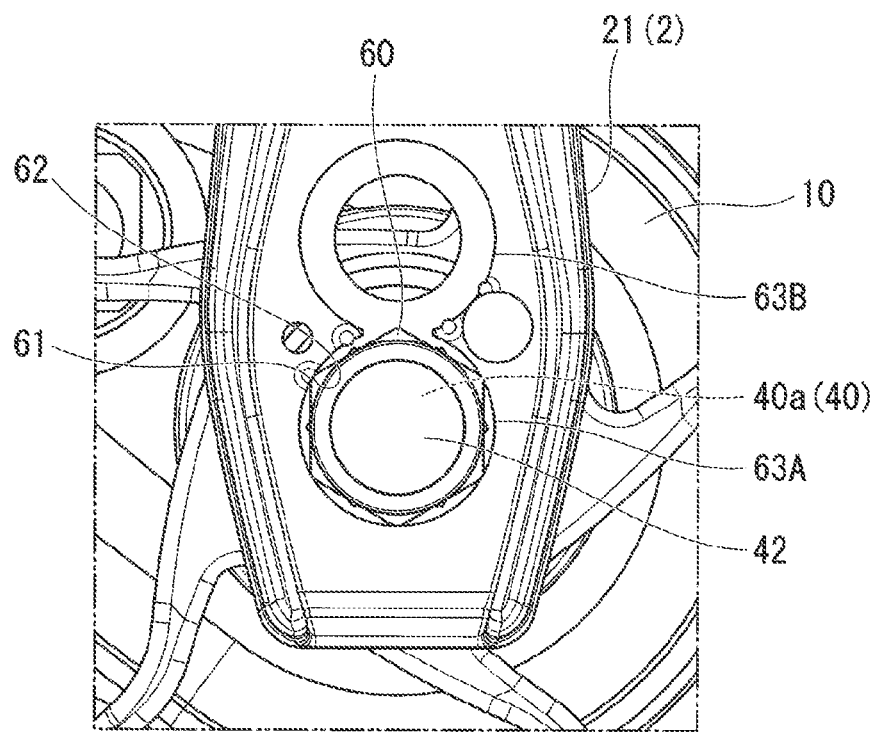
FIG. 12 is a diagram showing a procedure for adjusting the position of the handle return subsequent to FIG. 11.

Thereafter, as shown in FIGS. 7 and 12, the cap 42 is screwed and tightened onto the male thread portion 40b of the shaft distal end portion 40a of the handle shaft 40, whereby the handle arm 21 is fixed.

A phase of the handle return on the handle shaft 40 corresponds to a position that is fixed by the position of the return pin 56 shown in FIG. 2 as described above. Therefore, by attaching to the hexagonal member 60 at a position where the rotation angle of the handle arm 21 has been changed, it is possible to change the handle return position of the handle 2 to a preferred position.

In the handle return position adjustment mechanism 6 according to the present embodiment, since the plurality of apex portions 61 of the hexagonal member 60 and the recessed grooves 62 are respectively arranged at intervals in the circumferential direction, it is possible to select a relative position in the rotational direction and engage the recessed grooves 62 of the handle 2 with the apex portions 61 of the hexagonal member 60 fitted in a non-rotatable manner on the handle shaft 40. As a result, the handle 2 is able to be mounted on the handle shaft 40 via the hexagonal member 60 and the recessed grooves 62, and the rotation angle corresponding to the circumferential spacing of the apex potions 61 of the hexagonal member 60 is able to be arbitrarily selected to attach the handle 2 to the handle shaft 40.

As described above, in the present embodiment, the handle return position in the rotational direction of the handle 2 can be easily adjusted without disassembling the dual-bearing reel 1 as in the conventional one, thereby making it possible for a user using the dual-bearing reel 1 to perform a handle return at a desired rotation angle and switch the clutch from the disengaged state to the engaged state.

Further, in the present embodiment, the pair of mounting portions 63A and 63B of the handle arm 21 are selected and engaged with the hexagonal member 60, whereby the supporting position in the longitudinal direction of the handle arm 21 supported by the handle shaft 40 is able to be adjusted in addition to the adjustment of the return position of the handle 2. In other words, it is possible to adjust the distance between the handle shaft 40 and the handle grip 22 of the handle arm 21 according to the user's preference.

According to the handle return position adjustment mechanism of the fishing reel of the present embodiment configured as described above, it is possible to easily adjust the position of the handle return to the user's preferred rotation angle without disassembling the reel.

Second Embodiment

Figure 13:
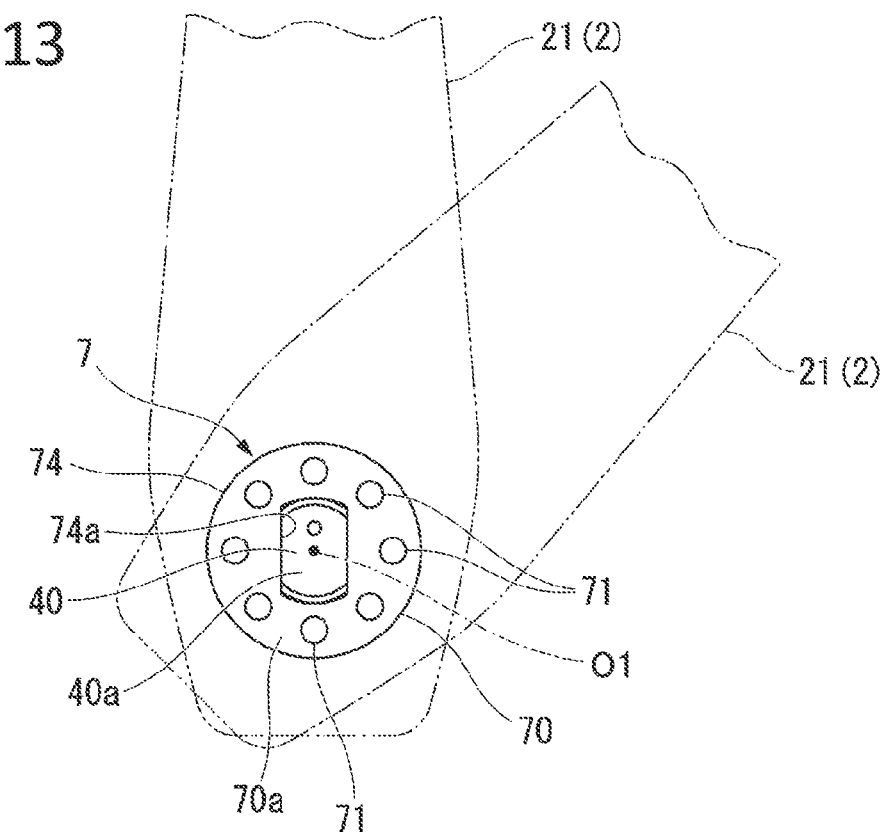
FIG. 13 is a diagram showing a configuration of a handle return position adjustment mechanism according to a second embodiment of the present disclosure, and is a side view of a washer member with projection as viewed from the direction of the handle shaft.
Figure 14:
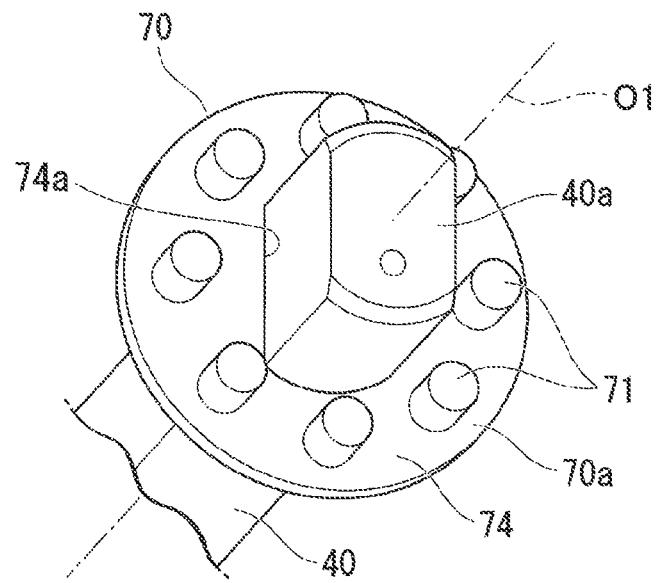
FIG. 14 is a perspective view of the washer member with projection shown in FIG. 13.

A handle return position adjustment mechanism 7 of the dual-bearing reel 1 according to a second embodiment has a configuration using a washer member with projection 70 as a position adjustment member, as shown in FIGS. 13 and 14. The handle return position adjustment mechanism 7 includes the washer member with projection 70 (a position adjustment member) having a plurality of convex portions 71, 71, . . . (first concave/convex portion, first rotation engagement portion) detachably disposed on the handle shaft 40 and a plurality of concave portions 72, 72, . . . (second concave/convex portion, second rotation engagement portion) formed on the handle arm 21 of the handle 2 and engageable with the plurality of convex portions 71 of the washer member with projection 70 as illustrated in FIG. 15.

The washer member with projection 70 is detachably attached to the shaft distal end portion 40a of the handle shaft 40 and is non-rotatably fitted around the handle shaft 40. The washer member with projection 70 has the plurality of convex portions 71, 71, . . . disposed on an outer peripheral side of one surface (a surface 70a facing the handle side in the direction of the handle axis O1) of a disc member 74, and has a through hole 74a at the central portion thereof which is fitted to the shaft distal end portion 40a of the handle shaft 40 (refer to FIG. 16). The shape of the through hole 74a is a non-circular shape having the same substantially rectangular shape as that of the shaft distal end portion 40a of the handle shaft 40. The plurality of (eight in this case) convex portions 71 of the washer member with projection 70 are disposed at intervals in the circumferential direction circling around the handle axis O1.

Figure 15:
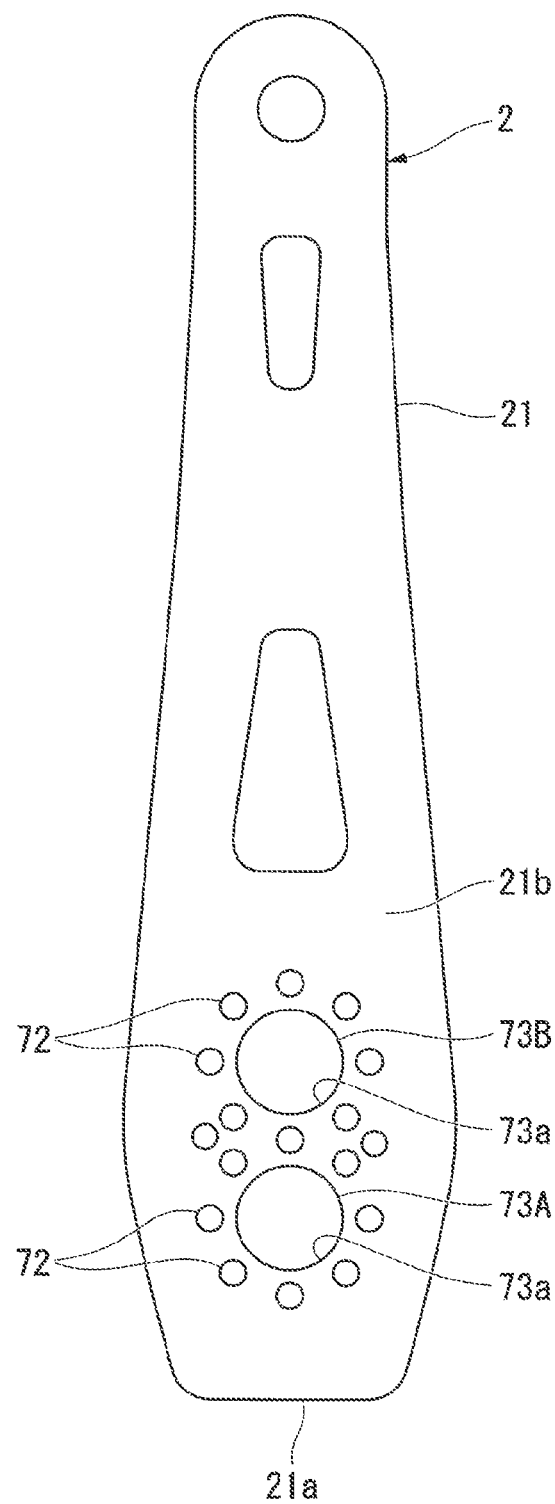
FIG. 15 is a plan view of a configuration of a handle arm according to the second embodiment.

As shown in FIG. 15, on the handle arm 21 of the handle 2, a pair of mounting portions 73A and 73B detachably attached to the handle shaft 40 is disposed side by side in the longitudinal direction of the handle arm 21. That is, either the first mounting portion 73A or the second mounting portion 73B is selectively attached to the handle shaft 40. When the handle arm 21 is attached to the handle shaft 40 using the second mounting portion 73B, the handle arm 21 is fixed at a position where the rotational radius of the handle grip 22 (refer to FIG. 1) is shorter than when the first mounting portion 73A is mounted on the handle shaft 40. Therefore, selecting the mounting portions 73A and 73B with respect to the handle shaft 40 allows the length of the handle arm 21 to be adjusted according to the user's preference.

A circular through hole 73a through which the shaft distal end portion 40a of the handle shaft 40 can be inserted is formed in the first mounting portion 73A on the side of the base end 21a of the handle arm 21. The plurality of (eight in this embodiment) concave portions 72, 72, . . . to be engaged with the convex portions 71 of the washer member with projection 70 are formed in the circumferential edge of the through hole 73a of the first mounting portion 73A on one surface 21b of the handle arm 21, and are disposed at a constant interval in the circumferential direction. The number of the concave portions 72 is the same as that of the convex portions 71, and the concave portions 72 are arranged at the same pitch in the circumferential direction.

The first mounting portion 73A forms a second rotation engagement group as a group of the plurality of concave portions 72, 72, . . . . The through hole 73a of the first mounting portion 73A is disposed coaxially with the handle axis O1 and the number of the plurality of concave portions 72 and the circumferential intervals thereof are equally pitched as in the convex portions 71 of the washer member with projection 70. With this configuration, the rotation angle of the handle 2 can be adjusted to eight rotation angles with respect to the handle shaft 40.

The second mounting portion 73B is located closer to the side of the handle grip 22 than the first mounting portion 73A in the longitudinal direction of the handle arm 21. With the same configuration as the first mounting portion 73A, the second mounting portion 73B has the through hole 73a and the plurality of concave portions 72, 72, . . . (eight in total). Note that in the present embodiment, the concave portion 72 that is adjacent to the first mounting portion 73A and the second mounting portion 73B is common for both mounting portions.

The handle arm 21 is configured so that a circumferential position thereof with respect to the handle shaft 40 is changeable by selectively engaging the concave portions 72 in the circumferential relative position with respect to the plurality of convex portions 71. As described above, the concave portions 72 engaging with the convex portions 71 of the washer member with projection 70 fitted to the shaft distal end portion 40a has a function of preventing the handle arm 21 from rotating.

Figure 16:
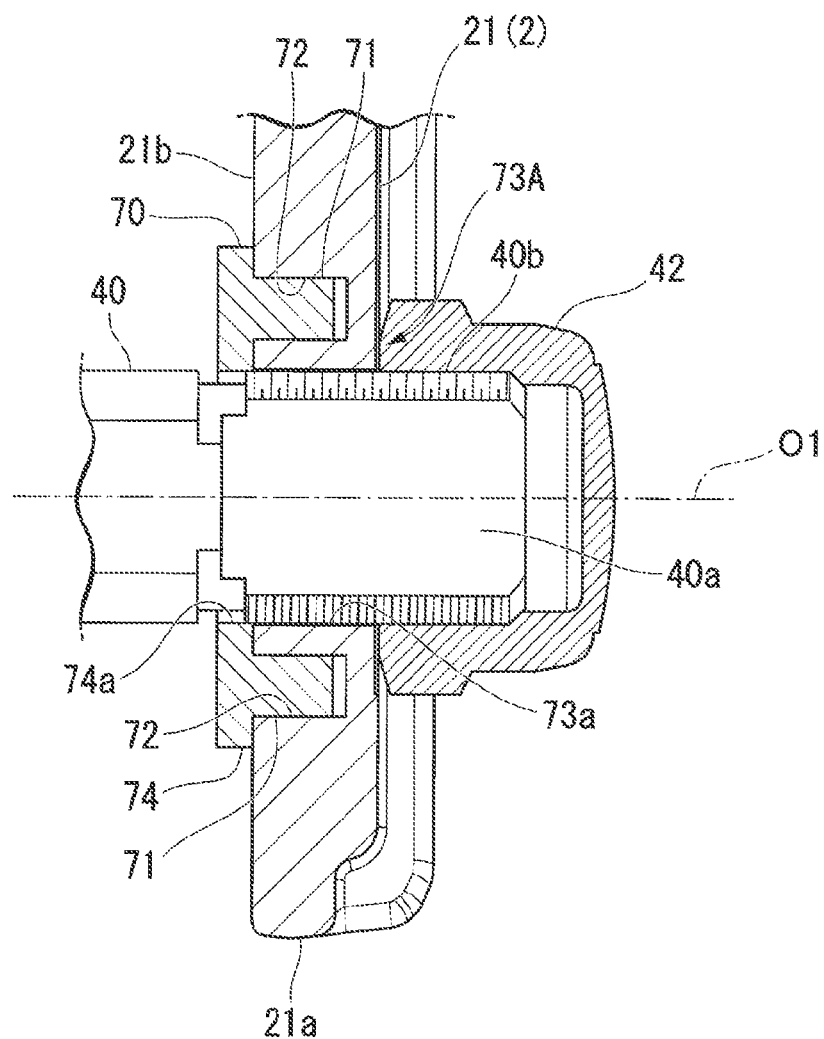
FIG. 16 is a side sectional view of the configuration of the handle return position adjustment mechanism according to the second embodiment and corresponds to FIG. 7.

In the case of adjusting the handle return position using the handle return position adjustment mechanism 7 of the second embodiment, as shown in FIG. 16, the washer member with projection 70 is first fitted to the shaft distal end portion 40a of the handle shaft 40 in the state where the handle 2 is removed from the handle shaft 40. At this time, the washer member with projection 70 is arranged such that the convex portions 71 are directed toward the handle 2 and is fixed so as to be non-rotatable with respect to the handle shaft 40. Subsequently, the first mounting portion 73A of the handle arm 21 is engaged with the washer member with projection 70 at an arbitrary rotation angle. Thereafter, the cap 42 is screwed onto the male thread portion 40b of the shaft distal end portion 40a of the handle shaft 40 and fastened, whereby the handle arm 21 is fixed.

Since the phase of the handle return on the handle shaft 40 is at a fixed position, attaching the handle arm 21 at the position where the rotation angle of the handle arm 21 is changed with respect to the washer member with projection 70 allows the position of the handle return of the handle 2 to be changed to a preferred position.

In the handle return position adjustment mechanism 7 according to the second embodiment, the relative position in the rotational direction is selected with respect to the plurality of convex portions 71 of the washer member with projection 70, which is non-rotatably fitted to the handle shaft 40, whereby the concave portions 72 of the handle 2 can be engaged with the plurality of convex portions 71. With this configuration, the handle 2 can be attached to the handle shaft 40 via the washer member with projection 70, and the rotation angle corresponding to the circumferential intervals of the convex portions 71 is arbitrarily selected so that the handle 2 can be attached to the handle shaft 40.

As described above, in the present embodiment, the handle return position in the rotational direction of the handle 2 is able to be easily adjusted without disassembling the dual-bearing reel 1 as in the conventional one, thereby making it possible for a user using the dual-bearing reel 1 to perform the handle return at a desired rotation angle and switch the clutch from the disengaged state to the engaged state.

The embodiments of the present disclosure have been described herein for purposes of illustration; these embodiments are presented as examples only, and not intended to limit the scope of the disclosure as defined by the appended claims and their equivalents. The embodiments can be implemented in various other forms, and that various omissions, substitutions, and changes can be made in the form and details of the described embodiments without departing from the gist of the disclosure. It is to be understood that embodiments and modifications thereof include, for example, those easily assumed by one skilled in the art, those that are substantially the same, equivalents within the scope of the disclosure, and the like.

For example, both of the plurality of concave and convex portions to be engaged are disposed, respectively, in the handle return position adjustment mechanism 6 that includes the hexagonal member 60 having the plurality of apex portions 61 and the first mounting portion 63 (the handle arm 21) having the plurality of recessed grooves 62 in the first embodiment, and in the handle return position adjustment mechanism 7 that includes the washer member with projection 70 having the plurality of convex portions 71 and the first mounting portion 73 (handle arm 21) having the plurality of concave portions 72 in the second embodiment; however a configuration can be adopted in which only one of the plurality of concave and convex portions is disposed. For example, in the above-described first embodiment, the recessed groove 62 can be disposed at only one position. Further, in the above-described second embodiment, the convex portion 71 of the washer member with projection 70 can be disposed at only one position. In short, the configuration only requires that at least one of the first rotation engagement portion and the second rotation engagement portion is arranged in plural at intervals in the circumferential direction circling around the handle shaft, and the rotation angle is selected whereby the handle arm 21 can be attached to the handle shaft 40.

Further, changes in the configuration, such as the number of concave/convex portions and the interval in the circumferential direction, can be appropriately performed. For example, in the first embodiment, the hexagonal member 60 having the six apex portions 61 is used, but the member 60 is not limited to the hexagonal shape, and other shapes such as triangle, pentagon, etc. can be adopted. Further, in the second embodiment, concave portions can be used instead of the convex portions 71 of the washer member with projection 70, and convex portions can be used instead of the concave portions 72 of the handle arm 21.

Furthermore, in the present embodiment, a pair of mounting portions are disposed along the longitudinal direction of the handle arm 21; however, a configuration with only one mounting portion can be adopted.

What is claimed is:

1. A handle return position adjustment mechanism for a fishing reel including a handle disposed on the fishing reel and supported by a handle shaft, the handle return position adjustment mechanism configured to adjust a return position of the handle in a rotational direction when a clutch is returned from a disengaged state to an engaged state, the clutch configured to switch between the engaged state in which a spool disposed in a reel body and the handle are connected to each other and the disengaged state in which the spool and the handle are disconnected from each other, the handle return position adjustment mechanism comprising:
    a position adjustment member configured to be detachably and non-rotatably fitted to the handle shaft and having a first rotation engagement portion; and
    a second rotation engagement portion disposed on the handle to be engageable with the first rotation engagement portion, wherein
    at least one of the first rotation engagement portion and the second rotation engagement portion includes a plurality of sub-portions which are arranged at intervals in a circumferential direction circling around the handle shaft, and
    the second rotation engagement portion is selectively engaged in a relative position in the circumferential direction with respect to the first rotation engagement portion.

2. The handle return position adjustment mechanism for a fishing reel according to claim 1, wherein
    the position adjustment member is a polygonal member having apex portions as the first rotation engagement portion, and
    the second rotation engagement portion is recessed grooves, the recessed grooves disposed at positions corresponding to the apex portions of the polygonal member, engageable with the apex portions, and extending in an axial direction of the handle shaft.

3. The handle return position adjustment mechanism for a fishing reel according to claim 1, wherein
    the position adjustment member has first concave/convex portions as the first rotation engagement portion, each of the first concave/convex portions including one of a convex portion and a concave portion disposed on a surface directed toward the handle in the axial direction of the handle shaft, and
    the second rotation engagement portion is a second concave/convex portion including another one of a convex portion and a concave portion disposed on a surface of the handle directed toward the position adjustment member so as to be engageable with the first concave/convex portions.

4. The handle return position adjustment mechanism for a fishing reel according to claim 1, wherein
    the handle includes a handle arm supported by the handle shaft and a handle grip disposed on at least one end of the handle arm,
    a plurality of mounting portions are disposed in the handle arm in a longitudinal direction of the handle arm so as to be detachably attached to the handle shaft, and
    at least one of the plurality of mounting portions is a second rotation engagement group that is a group of the plurality of sub-portions of the second rotation engagement portion to be engaged with the first rotation engagement portion of the position adjustment member.

5. The handle return position adjustment mechanism for a fishing reel according to claim 1, wherein
    the second rotation engagement portion is disposed in an inner periphery of a hole formed in the handle, and
    the second rotation engagement portion is engaged with the first rotation engagement portion in a state in which the second rotation engagement portion is located radially outside the first rotation engagement portion.

6. The handle return position adjustment mechanism for a fishing reel according to claim 1, wherein
    the position adjustment member has a through hole formed at a center thereof, the through hole configured to receive the handle shaft.

7. A fishing reel comprising:
    a reel body;
    a handle configured to rotate a spool disposed on the reel body, the handle supported by a handle shaft;
    a clutch configured to switch between an engaged state in which the spool and the handle are connected to each other and a disengaged state in which the spool and the handle are disconnected from each other;

a handle return position adjustment mechanism configured to adjust a return position of the handle in a rotational direction when the clutch is returned from the disengaged state to the engaged state, wherein
the handle return position adjustment mechanism includes
a position adjustment member detachably and non-rotatably fitted to the handle shaft and having a first rotation engagement portion, and
a second rotation engagement portion disposed on the handle to be engageable with the first rotation engagement portion,
at least one of the first rotation engagement portion and the second rotation engagement portion includes a plurality of sub-portions which are arranged at intervals in a circumferential direction circling around the handle shaft, and
the second rotation engagement portion is selectively engaged in a relative position in the circumferential direction with respect to the first rotation engagement portion.

* * * * *